United States Patent [19]

Litz

[11] 4,309,621
[45] Jan. 5, 1982

[54] INTEGRATED FLUID DYNAMOELECTRIC MACHINE

[75] Inventor: Donald C. Litz, Murrysville, Pa.

[73] Assignee: Westinghouse Electric Corp., Pittsburgh, Pa.

[21] Appl. No.: 111,418

[22] Filed: Jan. 11, 1980

[51] Int. Cl.³ .............................................. H02P 9/04
[52] U.S. Cl. ...................................... 290/52; 290/1 R
[58] Field of Search ..................................... 290/52, 1

[56] References Cited

U.S. PATENT DOCUMENTS

| | | | |
|---|---|---|---|
| 2,031,968 | 2/1936 | Mathius | 290/52 |
| 2,743,375 | 4/1956 | Parker | 290/52 |
| 2,949,540 | 8/1960 | Clayton | 290/52 |

Primary Examiner—J. D. Miller
Assistant Examiner—John W. Redman
Attorney, Agent, or Firm—F. J. Baehr, Jr.

[57] ABSTRACT

A turbine generator or motorized compressor wherein the blades of the turbine or compressor serve as armature conductors for a DC homopolar machine having a single stator which serves as a housing for the turbine or compressor and houses a field coil.

5 Claims, 3 Drawing Figures

INTEGRATED FLUID DYNAMOELECTRIC MACHINE

BACKGROUND OF THE INVENTION

This invention relates to a fluid dynamoelectric machine and more particularly to a fluid machine which operates a motor or a generator.

Fluid machines such as turbine compressors and pumps have been coupled to motors or generators, however, combining the two machines into a single structure not only save substantial material, but facilitates unique design latitude. Aerodynamic forces can be balanced by electromagnetic forces to reduce stresses on the roots of the blades and allow for improved designs.

SUMMARY OF THE INVENTION

In general, a fluid and dynamoelectric machine, when made in accordance with this invention, comprises a rotor, a circular array of rotatable blades disposed on said rotor, a shroud disposed at the radially outer tip of said rotatable blades, a stator encircling the rotor and a conductive coil disposed in the stator encircling the rotor. The machine also comprises a circular array of stationary blades disposed in the stator, a brush disposed to run on the shroud and a brush disposed to run on the rotor, whereby in one mode of operation when power is supplied to the brushes fluid is pumped by the machine and in another mode of operation when pressurized fluid is delivered to the machine power is generated.

BRIEF DESCRIPTION OF THE DRAWINGS

The object and advantages of this invention will become more apparent from reading the following detailed description in connection with the accompanying drawings, in which.

DESCRIPTION OF THE PREFERRED EMBODIMENT

Figure 1:
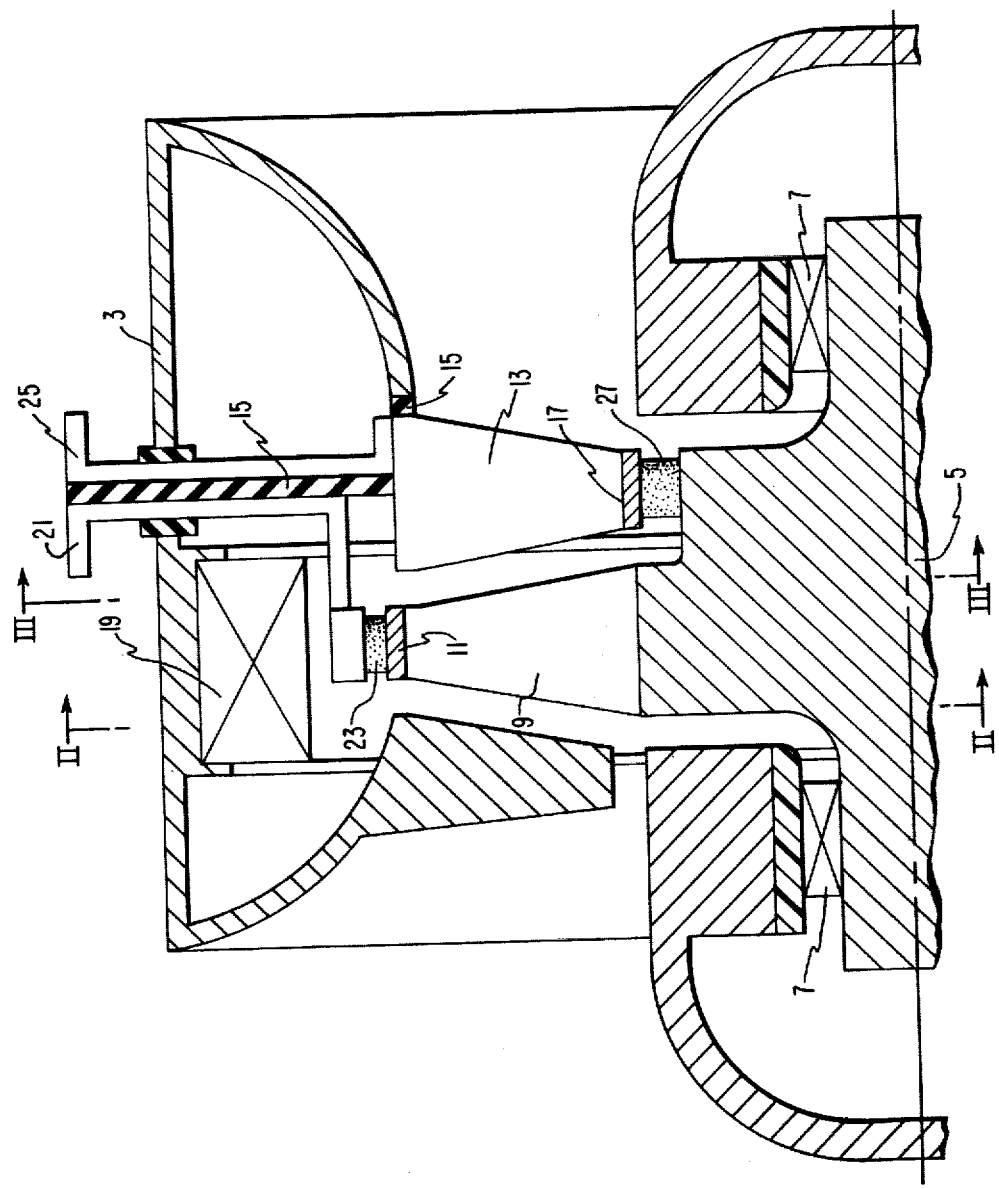
FIG. 1 is a sectional view of an integrated fluid dynamoelectric machine made in accordance with this invention.
Figure 2:
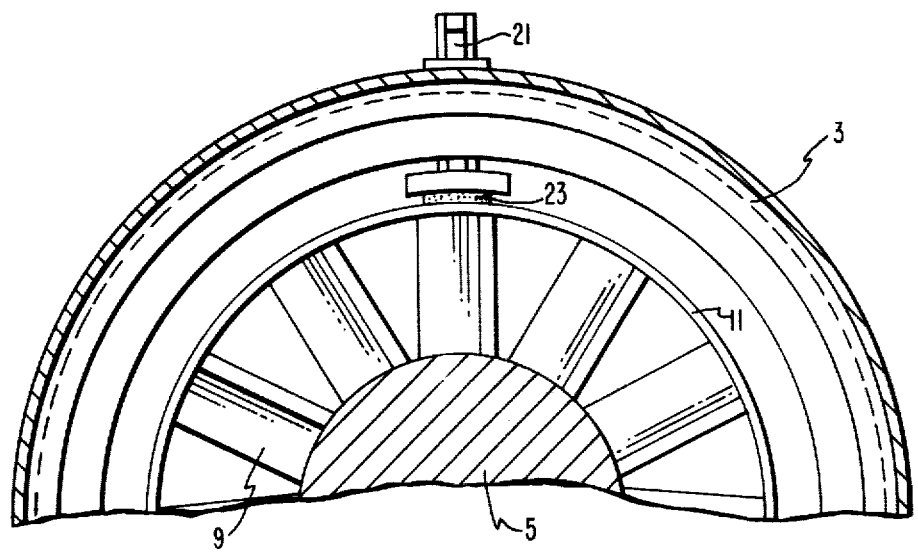
FIG. 2 is a sectional view taken on line II—II of FIG. 1.
Figure 3:
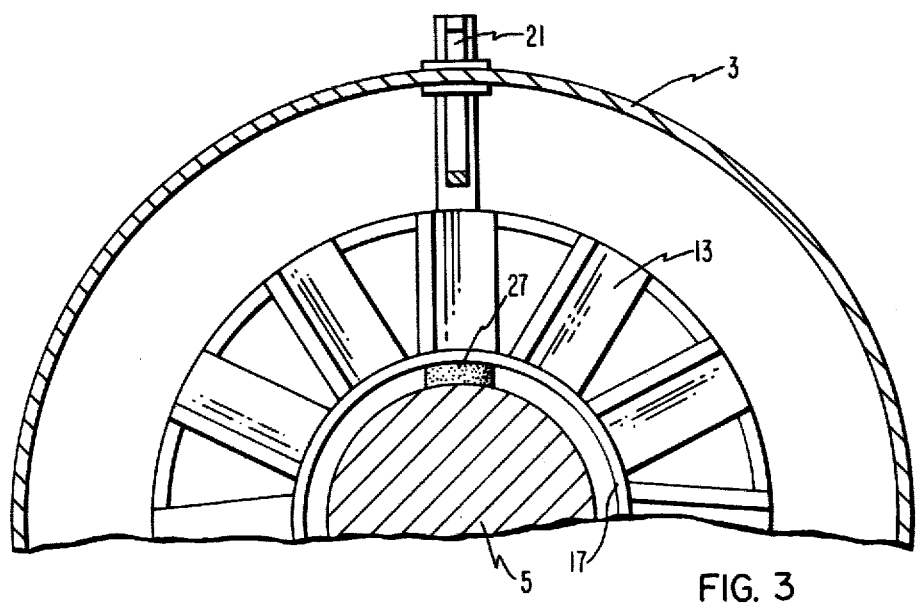
FIG. 3 is a sectional view taken on line III—III of FIG. 1.

Referring now to the drawings in detail there is shown in FIGS. 1 through 3 a fluid dynamoelectric machine 1 such as a turbine generator, compressor motor or pump motor combination.

The machine 1 comprises a stator or stationary portion 3 and a rotor, armature or rotating portion 5.

The rotor 5 is rotatably disposed within the stator and has bearings 7 on both ends thereof and insulators electrically insulating the rotor from the stator. The rotor 5 has a plurality of rotatable blades 9 disposed in a circular array with a shroud ring 11 disposed on the outer tip of the rotatable blades 9. The rotatable blades 9 and rotor 5 are preferably formed from ferromagnetic materials.

The stator 3 has a plurality of stationary blades 13 disposed in a circular array adjacent the array of rotatable blades 9. One of said stationary arrays is electrically isolated from the stator 3 by insulators 15. The stationary blades 13 have a shroud 17 disposed on their radially inner end.

A coil 19 is disposed in the stator 3 and encircles the arrays of rotatable blades 9. The coil 19 is formed from a continuous conductor having a plurality of electrically insulated turns which encircle the rotatable blades 9.

A first lead or conductor 21 extends into the stator and is electrically insulated therefrom. Brushes 23 are disposed to contact the shroud ring 11 and the rotatable blades 9 and electrically connected to the conductor 21.

A second lead or conductor 25 extends into the stator 3 and is electrically insulated therefrom and electrically connected to the array of stationary blades 13 which are electrically insulated from the stator 3. Brushes 27 electrically connect the stationary blades 13 to the rotor whereby current flowing in series through the rotatable blades 9, the rotor 5, and the electrically isolated stationary blades 13.

If the machine is operated in the turbine generator mode, the coil 19 is energized to produce axial flux. The turbine blades being driven by a pressurized motorized fluid rotated along with the rotor 5. As the blades 9 rotate in the axial magnetic field, a voltage gradient will be produced from the tip to their inner end and by utilizing the brushes 23 and 27 a DC electric current can be drawn from the leads 21 and 25. Since the rotatable and stationary blades act as an armature circuit, a circumferential self-field is generated between the two sets of blades which field may cause repulsion forces between the two sets of blades. This force may be additive or subtractive with respect to the aerodynamic forces on the blades depending on the turbine design and fluid flow characteristics. Thus, the thrust forces on the turbine blades can be reduced simplifying the design of the turbine.

The voltage developed by the machine can be calculated by the formula:

$$V = k\phi\omega$$

where:

$k$ = proportionality constant depending on the geometry of the machine;

$\phi$ = total flux cut by the armature conductors;

$\omega$ = angular velocity.

In generating equipment high voltages are desirable to minimize transmission bus size. In the machine set forth herein the voltage may be minimized by operating the machine at the highest speed and magnetic field strength. Material strength limitations set the maximum speed and the electrical excitation system determines the strength of the magnetic field. Two types of excitation are available resistive copper or other metal windings and superconducting windings. The use of resistive copper windings will require an addition of ferromagnetic materials in the magnetic circuit to limit coil size to an acceptable value, this can be accomplished by fabricating the blades and outer shell from ferromagnetic materials. Utilizing this approach flux densities up to 2 tesla can be developed. The use of superconducting field windings will produce much higher fields in the range of 8 to 10 tesla with $Nb_3Sn$ superconductors. Ferromagnetic materials are not required in the case of superconductors, since the fields thereby generated are far in excess of the saturation point of such materials. By connecting a continuous slip ring to various groups of rotating blades and connecting these in series high voltages can be achieved. While the preferred embodiment describes a turbogenerator, the machine will serve as a motorized compressor or pump by applying voltage to the leads rather than supplying pressurized motor fluid to the turbine.

What is claimed is:

1. A fluid dynamoelectric machine comprising, a rotor, a circular array of rotatable blades fixed to said rotor, and rotatable therewith, a shroud disposed at the radial outer tip of said rotatable blades, a stator encircling said rotor, a conductive coil disposed in said stator and encircling said rotor, a circular array of stationary blades disposed in said stator, a first brush so disposed to make electrical contact with said rotating shroud, a second brush disposed to make electrical contact with said rotating rotor, whereby in one mode of operation current flows through said shroud, rotatable blades and rotor so that when power is supplied to said brushes fluid is pumped by said machine and in another mode when pressurized fluid is directed through said blades said machine generates power.

2. A machine as set forth in claim 1 wherein the coil is one continuous winding.

3. A machine as set forth in claim 1 wherein the blades are made of ferromagnetic material.

4. A machine as set forth in claim 1 wherein the blades and rotor are formed of ferromagnetic material.

5. A machine as set forth in claim 1 and further comprising a ring disposed on the radially inner end of said stationary blades and said brush disposed to make electrical contact with said rotor is disposed between said inner ring and said rotor.

* * * * *